(12) United States Patent
Ozaki

(10) Patent No.: US 9,116,416 B2
(45) Date of Patent: Aug. 25, 2015

(54) ELECTRONIC DEVICE

(75) Inventor: Yoko Ozaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 835 days.

(21) Appl. No.: 13/299,993

(22) Filed: Nov. 18, 2011

(65) Prior Publication Data
US 2012/0134661 A1 May 31, 2012

(30) Foreign Application Priority Data

Nov. 26, 2010 (JP) ................................. 2010-263478

(51) Int. Cl.
G03B 17/02 (2006.01)
(52) U.S. Cl.
CPC ...................................... G03B 17/02 (2013.01)
(58) Field of Classification Search
CPC ....................................................... G03B 17/02
USPC ......................................................... 396/535
See application file for complete search history.

(56) References Cited

U.S. PATENT DOCUMENTS

| 5,249,102 | A * | 9/1993 | Ogawa et al. ................. 361/728 |
| 8,160,661 | B2 * | 4/2012 | Wang et al. ................. 455/575.4 |
| 8,340,514 | B2 * | 12/2012 | Kusatsugu .................... 396/535 |
| 8,471,956 | B2 * | 6/2013 | Fortmann ...................... 348/373 |
| 2003/0090589 | A1 * | 5/2003 | Robins et al. ................. 348/373 |
| 2004/0067054 | A1 * | 4/2004 | Ichikawa et al. .............. 396/448 |
| 2006/0203124 | A1 * | 9/2006 | Park et al. ...................... 348/376 |
| 2007/0165996 | A1 * | 7/2007 | Inaba et al. ..................... 386/38 |
| 2009/0252487 | A1 * | 10/2009 | Matsumoto ................... 396/448 |
| 2009/0279884 | A1 * | 11/2009 | Matsumoto ................... 396/448 |
| 2010/0245659 | A1 * | 9/2010 | Nam .............................. 348/372 |
| 2011/0110547 | A1 * | 5/2011 | Oishi et al. .................... 381/332 |

FOREIGN PATENT DOCUMENTS

JP 09-139582 5/1997

* cited by examiner

Primary Examiner — Rodney Fuller
(74) Attorney, Agent, or Firm — Cowan, Liebowitz & Latman, P.C.

(57) ABSTRACT

A sliding lid of an electronic device can move between an open state and a closed state, and in the open state, the external connecting terminals are exposed. The sliding lid includes a plurality of projecting shafts that project from the outer peripheral portion and a projecting portion that is formed on the surface of the device main body. A jack holder is provided with first guide rails and second guide rails that are rail members that guide the sliding lid, where first guide rails correspond to the projecting shafts of the sliding lid and second guide rails correspond to the projecting portion. In a closed state, the projecting shafts respectively abut the rails. While the sliding lid moves from the closed state to the open state, a projecting shaft separates from the first guide rails and the projecting portion slides to abut the second guide rails.

8 Claims, 6 Drawing Sheets

ELECTRONIC DEVICE

BACKGROUND OF THE INVENTION

1. Field of the Invention

The present invention relates to an opening and closing structure in which a sliding lid is accommodated in a main body interior in an electronic component that is provided with an opening and closing-type sliding lid.

2. Description of the Related Art

Conventionally, in electronic devices such as a digital camera or a digital video camera or the like, a cover that protects memory media and external connection terminals from dust and raindrops and the like is provided. Among these, in a sliding-type opening-closing cover (sliding lid), a method (the inner sliding method) is known in which a cover that is accommodated inside of the electronic device is opened while being pressed by the force of a finger.

In the cover opening-closing device disclosed in Japanese Patent Laid-Open No. H09-139582, guide grooves (60, 63) are formed inclined toward the opening direction of the cover (2) on a holder (3). Projecting shafts (41, 43) that project toward a side direction of the cover (2) slide along these guide grooves to open the cover (2).

However, in Japanese Patent Laid-Open No. H09-139582, the four projecting shafts are structured so as to engage and slide on each of the guide grooves on the holder-side wall, and thus, the following condition occurs. All of the projecting shafts provided at the end portion in the opening and closing direction of the cover (the vertical direction in FIG. 2 of Japanese Patent Laid-Open No. H09-139582) are engaged by the guide grooves of the holder, and thus, a space that accommodates the cover in its open state and its closed state is necessary. Furthermore, because the cover is slid and accommodated in the interior portion of the device, a space in which the projecting shafts of the cover move inclined in the open state and the closed state (accommodation space in the inward direction of the holder) is also necessary. Thus, accommodating the sliding lid within a limited space in the device main body is a difficult.

SUMMARY OF THE INVENTION

The present invention increases, in an electronic device having a sliding lid, the space efficiency when the sliding lid is accommodated inside the device main body.

In order to solve the above state, the device according to the present invention is an electronic device that is provided with a sliding lid that can move from an open state to a closed state and is positioned inside of the device main body in the open state, and rail members that guide the sliding lid, wherein a plurality of projecting shafts that project from the outer peripheral surface and at least one projecting portion that is formed on the surface on the device main body side are provided on the sliding lid, and a first guide rail opposed to the plurality of projecting shafts and a second rail opposed to the projecting portion are provided along the movement direction of the sliding lid. In the closed state, the plurality of projecting shafts abuts the first guide rail, and while the sliding lid moves from the closed state to the open state, at least tone among the plurality of projecting shafts separates from the first guide rail, and the projecting portion abuts the second guide rail.

According to the present invention, the space efficiency can be increased when the sliding lid is accommodated inside the device main body.

Further features of the present invention will become apparent from the following description of exemplary embodiments with reference to the attached drawings.

DESCRIPTION OF THE EMBODIMENTS

Below, an electronic device according to the embodiments of the present invention will be explained in detail with reference to the figures.

Figure 1:
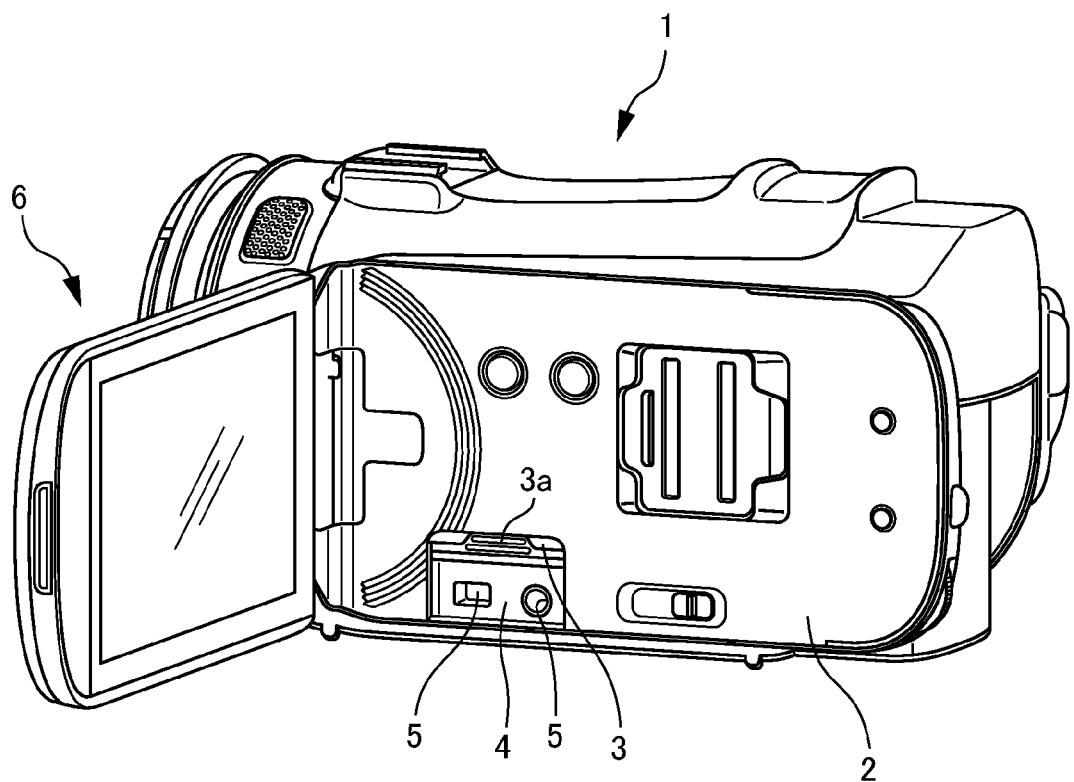
FIG. 1 is a perspective view that shows the external appearance of a video camera as an electronic device according to an embodiment of the present invention.

FIG. 1 is a perspective view that shows an example of the external appearance of a video camera 1, which serves as an example of an electronic device or an image capturing apparatus according to an embodiment of the present invention. FIG. 1 shows the state in which the main body cover 2 has been exposed by opening the display unit 6 of a video camera 1 to the outside of the main body. The main body cover 2 forms the side surface portion of the camera main body, and the sliding lid 3 is provided. The sliding lid 3 can move from an open state to a closed state, and in a closed state, in which an opening that is formed in the main body cover 2 is closed, the sliding lid 3 is positioned inside the device main body of the video camera 1. The sliding lid 3 covers the external connection terminal 5 in the close state, and in the open state, the external connecting terminal 5 is exposed to the outside. FIG. 1 shows the open state in which the sliding lid 3 is accommodated inside the main body cover 2.

The jack holder 4 is a holding member that holds the external connecting terminal 5, and is also a rail member that is provided with guide rails that guide the sliding lid 3. Various types of jack are used in the external connection terminal 5, and they are connected to an external device by connecting cables (not illustrated). The display unit 6 is installed so as to be capable of opening and closing with respect to the main body of the video camera 1, and the main body cover 2 is covered in the accommodation state (the state in which the display unit 6 is closed).

Figure 2A:
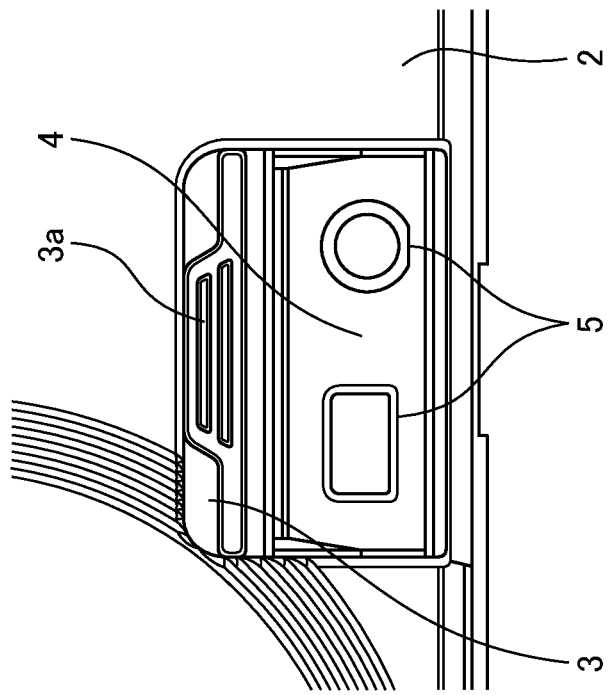
FIG. 2A is a drawing that shows the closed state of the sliding lid.
Figure 2B:
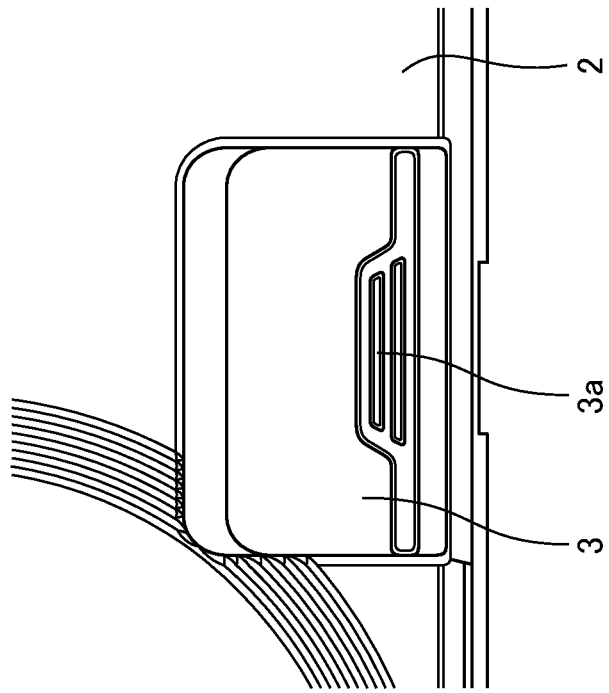
FIG. 2B is a drawing that shows the open state of the sliding lid.

FIGS. 2A and B are expanded views of the slide lid 3, and show the open state A and the closed state B of the sliding lid 3. A finger engaging piece 3a is provided on the outer surface of the sliding lid 3. The sliding lid 3 is moved from the closed state that is shown in FIG. 2A to the open state that is shown in FIG. 2B by an operator sliding the bottom portion of the sliding lid 3 or the finger engaging piece 3a while pressing in the upward direction in FIGS. 2A and B. When using a connecting cable (not illustrated), the operator connects the connecting cable to the external connecting terminal 5 in the open state. Because the sliding lid 3 is positioned inside the device main body of the video camera 1 in the open state, the sliding lid 3 does not project outward from the main body cover 2. Thus, in the state in which the display unit 6 is accommodated in the video camera 1, a portion of the sliding lid 3 does not abut the display unit 6 to interfere with the accommodation thereof. In addition, from the viewpoint of design, the appearance is also improved.

Next, the opening and closing mechanism of the sliding lid 3 will be explained with reference to FIG. 3 to FIG. 6.

Figure 3:
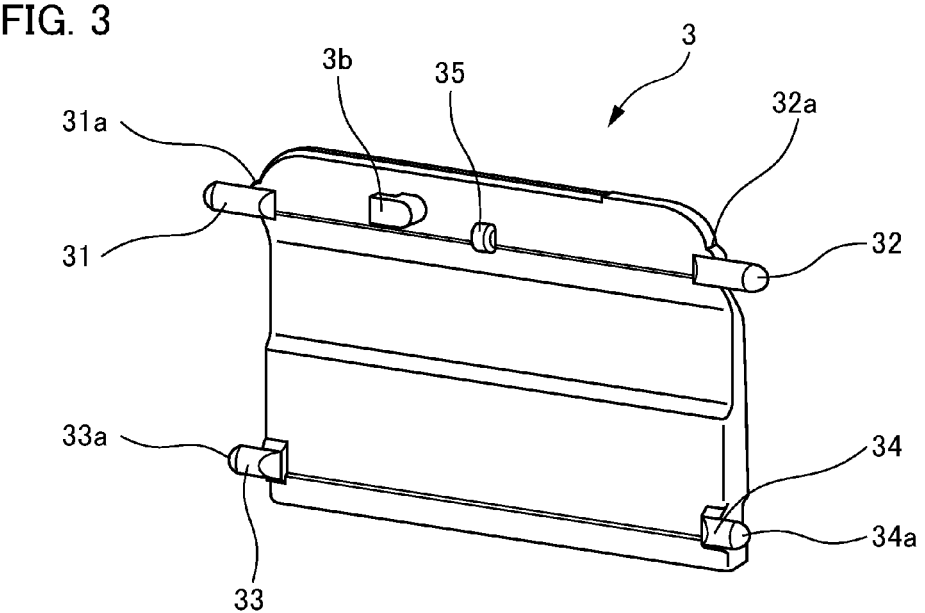
FIG. 3 is a perspective view in which the sliding lid is viewed from the back surface.

FIG. 3 is a perspective view in which the sliding lid 3 is viewed from the back side, that is, viewed from the device main body side. The sliding lid 3 is provided with projecting shafts 31 to 34, and a projecting portion 35, and these slide on rails provided on the main body cover 2 and the jack holder 4, which will be described below. The four projecting shafts 31 to 34 project outward from the side surface portion of the sliding lid 3, and are arranged at four locations on the outer peripheral surface parallel to the movement direction of the sliding lid 3. In addition, the projecting portion 35 shown in the present example is provided at the substantial center closest to the upper end at the back surface (the surface on the device main body side) of the sliding lid 3. The formation position of the projecting portion 35 is preferably at the center of the position at the back surface of the sliding lid 3 at which the two projecting shafts 31 and 32 are formed, where the two projecting shafts 31 and 32 form a pair in a direction perpendicular to the movement direction of the sliding lid 3. However, the formation position of the projecting portion 35 may be provided between this center position and the formation position of the projecting shaft 32. Note that in the present example, the projecting shafts 31 and 32 are formed closest to the upper end of the outer peripheral surface of the sliding lid 3 and that the projecting shafts 33 and 34 are formed closest to the lower end of the outer peripheral surface of the sliding lid 3. In addition, in the present example, only one projecting portion 35 is formed on the sliding lid 3, but a plurality of projecting portions may be formed. Sliding portions (ribs) 31a and 32a are respectively provided on the side surface of the sliding lid 3 in proximity to the projecting shafts 31 and 32. The distal ends of the projecting shafts 33 and 34 respectively serve as sliding portions 33a and 34a. A spring catch portion 3b is provided between the projecting portion 35 and the projecting shaft 31, and a reversing spring, to be explained below, is attached thereto.

Figure 4:
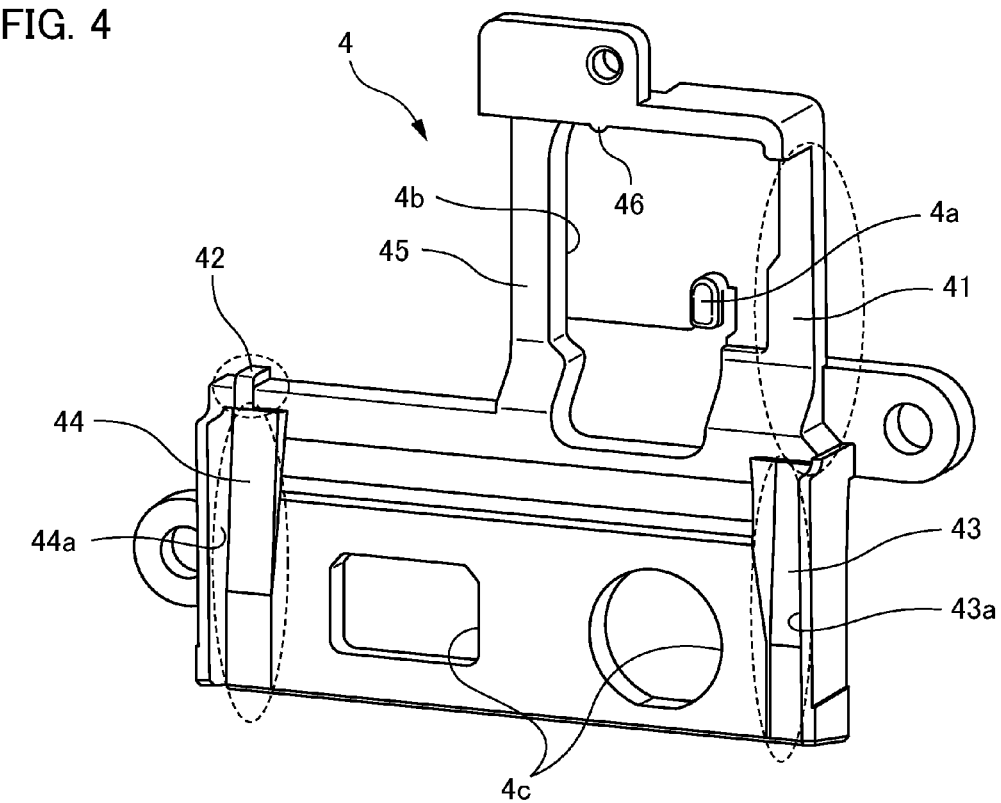
FIG. 4 is a perspective view that shows the structure of the jack holder.

FIG. 4 is a perspective view in which the jack holder 4 is viewed from the outside. A plurality of rails 41 to 45 are formed on the jack holder 4. The rails 41 to 44 (refer to the broken line in the figure), which form the first guide rails, are rails along with the projecting shafts 31 to 34 of the sliding lid 3 respectively slide. However, although the rail 42 guides the projecting shaft 32 when the sliding lid 3 is in a closed state, because the rail 42 is formed so as to rise only a little above the edge, the sliding lid 3 is guided by the rail 42 only part of the way while changing from the closed state to the open state. In contrast, the rail 45 is a second guide rail for sliding the projecting portion 35. While the sliding lid 3 moves from the closed state to the open state, the rail 45 guides the projecting portion 35 when the projecting shaft 32 is no longer guided by the rail 42. Walls 43a and 44a are respectively provided at the side of the rails 43 and 44 in order for the sliding portions 33a and 34a of the sliding lid 3 to slide. A reversing spring, to be described below, is attached to the spring catch portion 4a, and an open portion 4b is formed between the rails 41 and 45. The upper end portion of the sliding lid 3 abuts the projecting portion 46 that is formed at the upper portion of the jack holder 4 in the open state. That is, the projecting portion 46 is a positioning portion that restricts the open position of the sliding lid 3. Note that disposition holes 4c for the external connecting terminals 5 are formed in the jack holder 4.

Figure 5A:
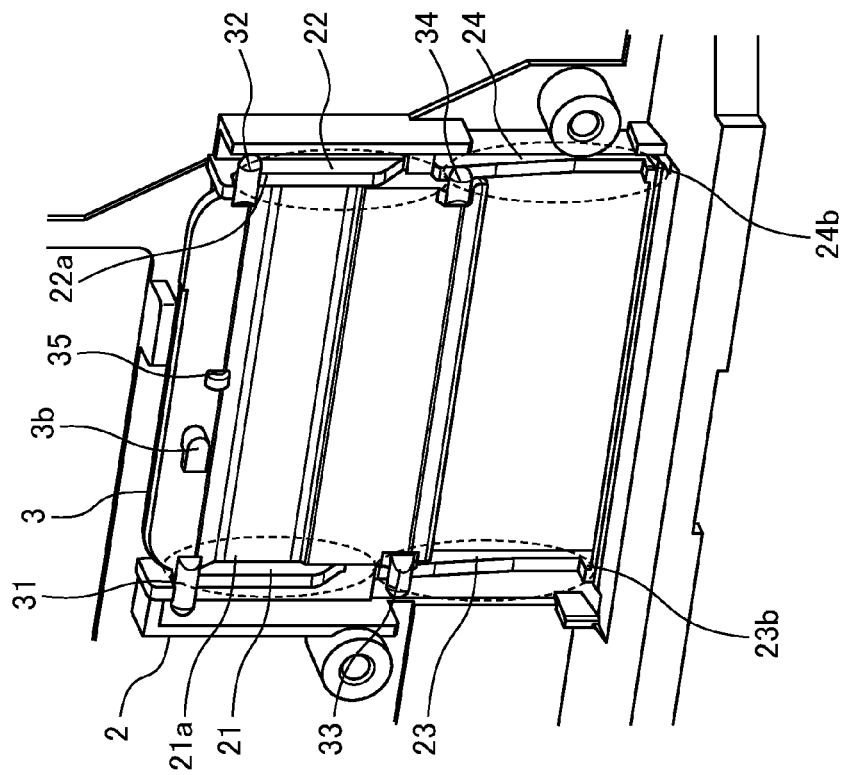
FIG. 5A is a perspective view that shows the sliding lid and the main body cover when viewed from the back surface in the closed state.
Figure 5B:
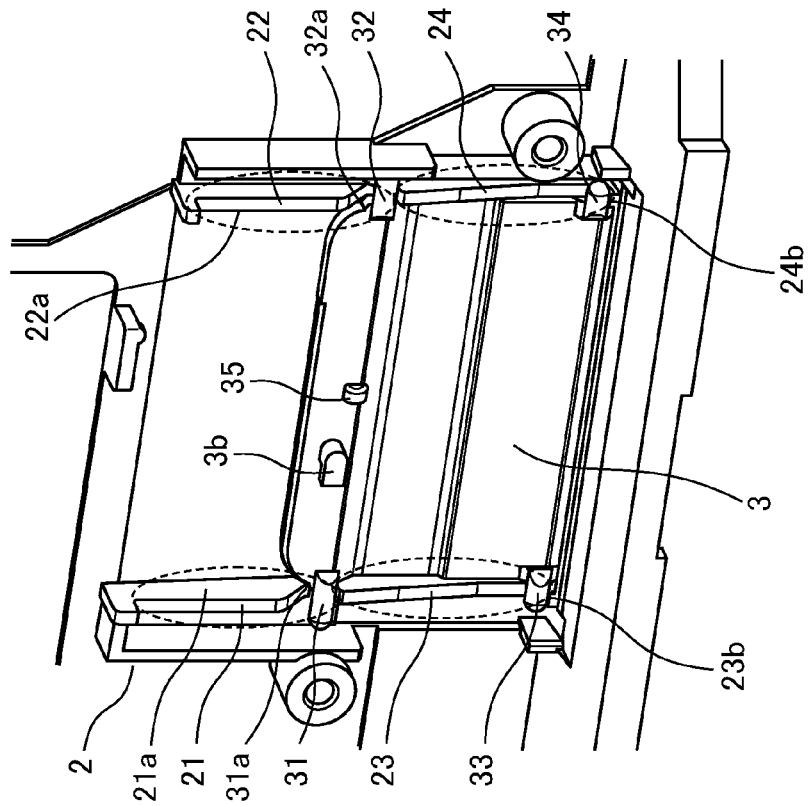
FIG. 5B is a perspective view that shows the sliding lid and the main body cover in the open state when viewed from the back surface.

FIGS. 5A and B are drawings for explaining the guide rails that are provided on the main body cover 2, and are perspective views viewed from the back side. FIG. 5A shows the closed state of the sliding lid 3, and FIG. 5B shows the open state of the sliding lid 3. Note that the jack holder 4 is detached for the sake of explanation.

Rails 21 to 24 (refer to the broken line frame in the figure) are formed on the back surface of the main body cover 2, and these are guide rails for respectively sliding the projecting shafts 31 to 34 of the sliding lid 3. In addition, walls 21a and 22a, for sliding the sliding portions 31a and 32a of the sliding lid 3, are respectively provided on the inside of the rails 21 and 22. The positioning portions 23b and 24b respectively formed on the lower portion of the rails 23 and 24 abut the sliding lid 3 and restricts the closing position thereof.

Based on the above, the projecting shaft 31 of the sliding lid 3 slides along the rail 21 that is provided on the main body cover 2 and the rail 41 that is provided on the jack holder 4. Similarly, the projecting shafts 33 and 34 of the sliding lid 3 respectively slide along the rails 23 and 24 that are provided on the main body cover 2 and the rails 43 and 44 that are provided on the jack holder 4. In contrast, the projecting shaft 32 of the sliding lid 3 is guided by the rail 22 that is provided on the main body cover 2 and the rail 42 that is provided on the jack holder 4 when the sliding lid 3 is in a closed state, but is not guided by the rail 42 while the sliding lid 3 is moving to the open state. At the same time, the projecting portion 35 of the sliding lid 3 is guided by the rail 45 provided on the jack holder 4 when the projecting shaft 32 is not guided by the rail 42.

Figure 6A:
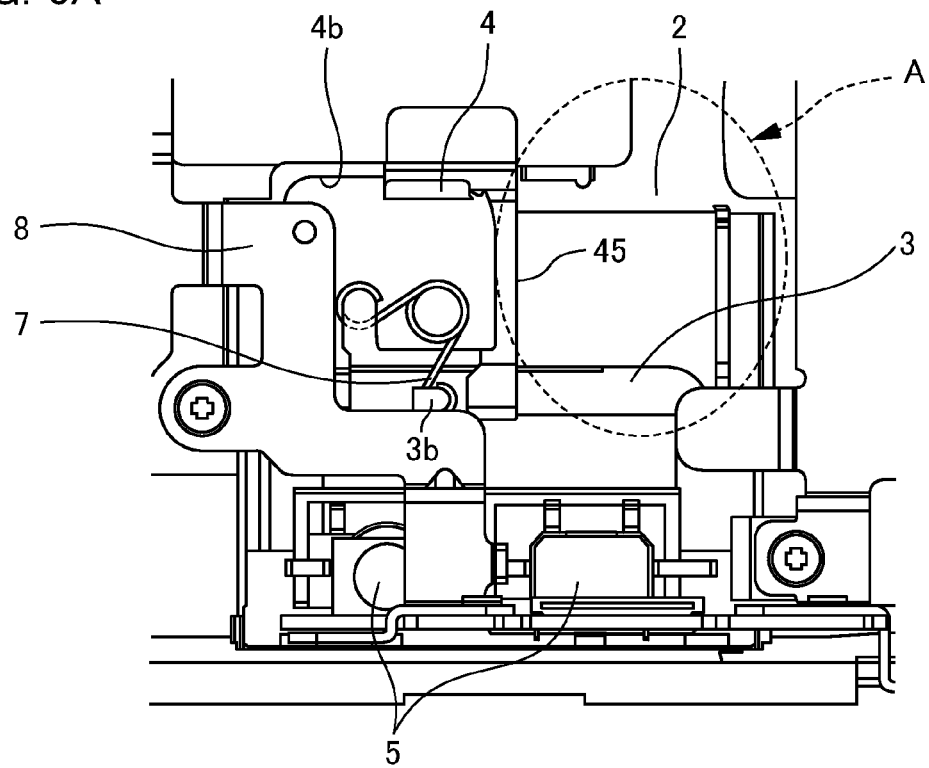
FIG. 6A is a drawing that shows the opening and closing structure of the sliding lid when viewed from the back surface in the closed state of the sliding lid.
Figure 6B:
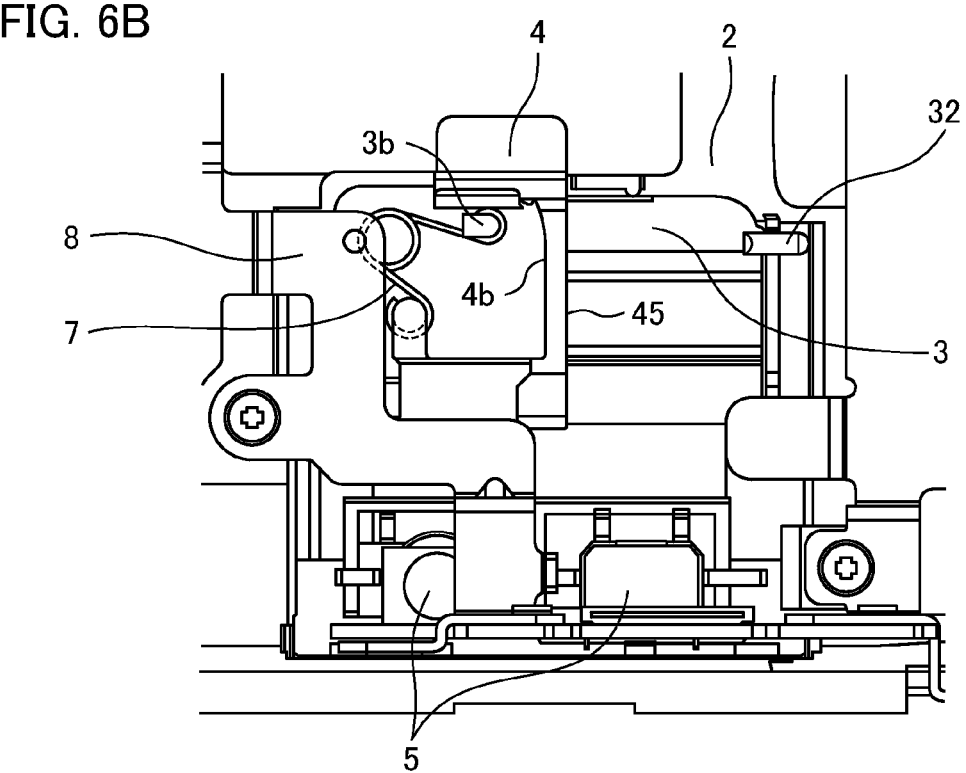
FIG. 6B is a drawing that shows the opening and closing structure of the sliding lid when viewed from the back surface in the open state of the sliding lid.

FIGS. 6A and B are drawings that show the state in which the sliding lid 3 and the jack holder 4 are attached to the main body cover 2 when viewed from the back side of the main body cover 2. FIG. 6A shows the closed state of the sliding lid 3, and FIG. 6B shows the open state of the sliding lid 3.

The reversing spring 7 is an urging member that control the opening and closing position of the sliding lid 3. One end of the reversing spring 7 is attached so as to be able to rotate with respect to the spring catch portion 3b of the sliding lid 3, and the other end thereof is attached so as to be able to rotate with respect to a spring catch portion 4a of the jack holder 4. Thereby, the reversing spring 7 rotates, and the reversing spring 7 does not hinder the movement of the sliding lid 3 while moving from the state of 6A to the state of 6B. In addition, the reversing spring 7 is accommodated inside the open portion 4b of the jack holder 4, and thus, ensuring space for the reversing spring at the periphery of the jack holder 4 is not necessary. A metal plate member 8 is a member that is used to fix the jack holder 4 by a screw or the like to the main body cover 2.

Figure 7A:
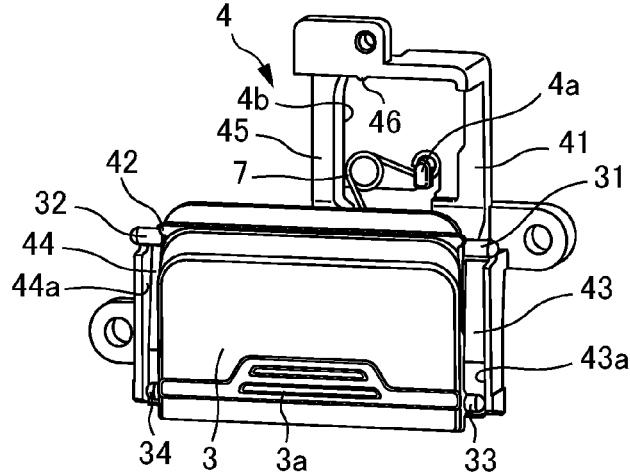
FIG. 7A is a perspective view that shows the closed state of the sliding lid with respect to the jack holder.
Figure 7B:
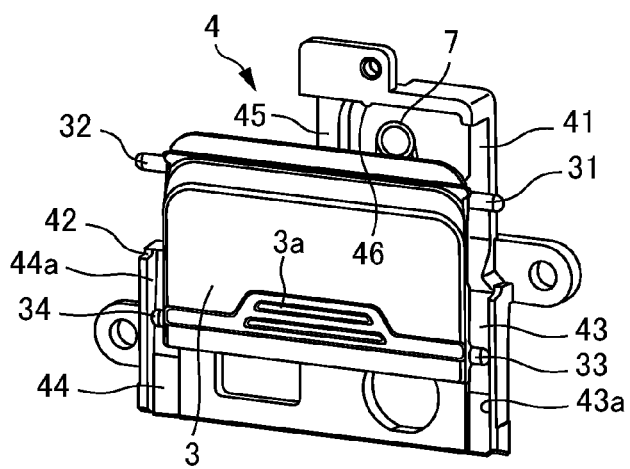
FIG. 7B is a perspective view that shows the state between the open state to the closed state of the sliding lid with respect to the jack holder.
Figure 7C:
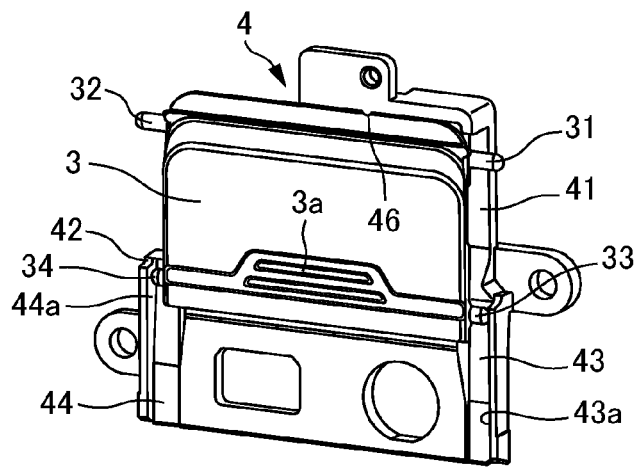
FIG. 7C is a perspective view that shows the opened state of the sliding lid with respect to the jack holder.

Next, the operation of the sliding lid 3 will be explained with reference to FIG. 7A to C. FIG. 7A to C are perspective views of the sliding lid 3 that has been assembled in the jack holder 4 when viewed from the outside.

The sliding lid 3 is urged downward by the force of the reversing spring 7, as shown in FIG. 7A, in a closed state. The projecting shafts 33 and 34 of the sliding lid 3 are positioned by respectively abutting the positioning portions 23b and 24b of the main body cover 2. In this closed state, the projecting shafts 31 and 34 of the sliding lid 3 are respectively supported on the rails 41 to 44 of the jack holder 4. The sliding lid 3 is in the state shown in FIG. 5A with respect to the main body cover 2, and the projecting shafts 31 to 34 of the sliding lid 3 are respectively supported on the rails 21 to 24 of the main body cover 2. As shown in FIG. 7B, when the operator slides the sliding lid 3 in the opening direction, the projecting shafts 31, 33, and 34 of the sliding lid 3 respectively slide on the rails 41, 43, and 44 of the jack holder 4. In contrast, the projecting shaft 32 separates from the rail 42, and the projecting portion 35 slides on the rail 45 of the jack holder 4. At this time, at the main body cover 2, the projecting shafts 31 to 34 of the sliding lid 3 are on each of the rails 21 to 24. In addition, as shown in FIG. 7C, the sliding lid 3 is urged upward by the force of the reversing spring 7 and abuts the projecting portion 46 that is provided on the upper portion of the jack holder 4. Thereby, the movement of the sliding lid 3 is stopped in the open state. At this time, at the main body cover, the projecting shafts 31 to 34 of the sliding lid 3 are on each of the rails 21 to 24 (refer to FIG. 5B).

In this manner, the sliding operation starts from the closed state, and the projecting shafts 31, 33, and 34 of the sliding lid 3 respectively slide on the rails 41, 43, and 44 of the jack holder 4. In addition, until the sliding lid 3 reaches the open state, the projecting shafts 31, 33, and 34 of the sliding lid 3 respectively slide on the rails 41, 43, and 44, and the projecting portion 35 slides on the rail 45. At this time, at the main body cover 2, the projecting shafts 31 to 34 slide on each of the rails 21 to 24. The projecting portion 35 is provided between the substantially center or the center position of the upper portion of the sliding lid 3 and the projecting shaft 32, and thus, even if the sliding lid 3 is pressed from the surface, the projecting portion 35 is supported on the rail 45. Thus, the sliding lid 3 can be prevented from slipping into the interior of the video camera main body. In addition, in the horizontal direction of the sliding lid 3, that is, in the direction along the projecting shafts 31 to 34, the sliding portions 31a and 32a are respectively restricted by the walls 21a and 22a of the main body cover 2. In addition, the sliding portions 33a and 34a are respectively restricted by the walls 43a and 44a of the jack holder 4. Thus, a condition can be prevented in which the sliding lid 3 inclines in the horizontal direction and thereby slips to the interior of the video camera main body or gets caught on the rails and does not slide.

As explained above, in the sliding operation of the sliding lid 3, the rails 41, 43, and 45 of the jack holder 4 are used, and rails for sliding the projecting shafts 32 (the open state portion of the rail 42) do not need to be formed on the jack holder 4. Therefore, within the range shown by the broken line A in FIG. 6A, space equivalent to the amount necessary for the guide rails for the projecting shaft 32 becomes free, and this contributes to a reduction in space.

In the present embodiment, the guide rails used in the movement of the sliding lid 3 change during the movement of the sliding lid 3 (refer to rails 42 and 45). That is, while the sliding lid 3 is moving from the closed state to the open state, at least the one projecting shaft 32 among the projecting shafts 31 to 34 separates from the rail 42 and the projecting portion 35 abuts the rail 45. Thereby, the rail 42 can be shortened because it is only required as a guide in the closed state, and an inner slide-type opening and closing mechanism can be realized while saving space. In addition, the reversing spring 7, which controls the opening and closing operation of the sliding lid 3, can rotate only between the jack holder 4 and the sliding lid 3, and thus, does not protrude to the outside of the jack holder 4 even in terms of external appearance. Thus, excessive space is not required for the reversing spring 7, and even when the reversing spring 7 rotates, the operation of the sliding lid 3 can be controlled in a state in which the reversing spring 7 is accommodated in the open portion 4b of the jack holder 4.

Above, the present invention has been described in detail based on a preferred embodiment, but the present invention is not limited to the particular embodiment that has been described. Various forms within a range that does not depart from the spirit of the present invention are also included in the technical range of the present invention. For example, in the above embodiment, a reversing spring 7 is used in the urging member of the sliding lid 3, but a plate spring or the like may also be used. In addition, a jack holder that is provided with guide rails has been illustrated in the above described embodiment. However, this is not limiting, and, for example, this may be the cover of a recording medium accommodating portion.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-263478 filed Nov. 26, 2010 which is hereby incorporated by reference herein in its entirety.

What is claimed is:
1. A cover opening and closing device, comprising:
a sliding lid that can move between an open state and a closed state, the sliding lid comprising:
a plurality of first guide members that are formed on both ends of the sliding lid in a direction perpendicular to the movement direction of the sliding lid; and
at least one second guide member that is formed on central part of the sliding lid in a direction that is perpendicular to the movement direction of the sliding lid; and
rail members that guide the sliding lid, the rail members comprising:
a plurality of first guide rails that are provided along the movement direction of the sliding lid, and contact with the first guide members at least while the sliding lid moving; and
at least one second guide rail that is provided along the movement direction of the sliding lid, and contacts with the second guide member at least while the sliding lid moving;
wherein, in the closed state, the plurality of first guide members contact with the first guide rails, and while the sliding lid moves from the closed state to the open state, at least one among the plurality of first guide members separates from at least one among the first guide rails and the second guide member contact with the second guide rail.
2. The cover opening and closing device according to claim 1, wherein, in the open state, at least one among the first guide members contacts with at least one among the first guide rails and the second guide member contacts with the second guide rails.

3. The cover opening and closing device according to claim 1, wherein the second guide member is formed at the center of the position at which two first guide members are formed, the first guide members forming a pair in a direction that is perpendicular to the movement direction of the sliding lid, or formed between the center of the positions at which the two first guide members are formed and the other first guide member.

4. The cover opening and closing device according to claim 1, further comprising:
   an urging member that is installed on the rail members and the sliding lid,
   wherein, in the closed state, the urging member urges the sliding lid in a closing direction, and in an open state, urges the sliding member in an opening direction.

5. The cover opening and closing device according to claim 1,
   wherein at least one positioning portion that restricts the opening position of the sliding lid are provided on the rail member.

6. The cover opening and closing device according to claim 5, wherein the at least one positioning portion restricts the position of the sliding lid in a direction perpendicular to the moving direction of the sliding lid.

7. An electronic apparatus provided with the cover opening and closing device recited in claim 1.

8. An image capturing apparatus provided with the cover opening and closing device recited in claim 1.

* * * * *